Sept. 7, 1965
J. J. MATTHEWS
3,204,495
INSULATION REMOVING TOOL
Filed Feb. 6, 1964
2 Sheets-Sheet 1
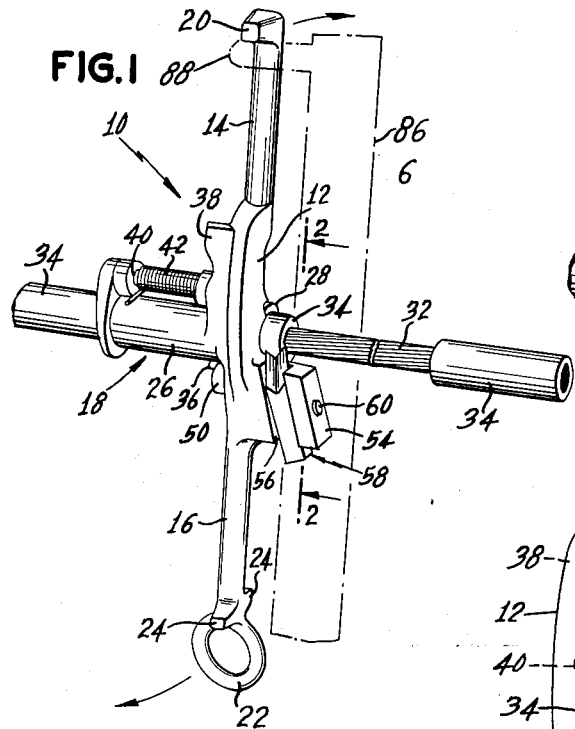
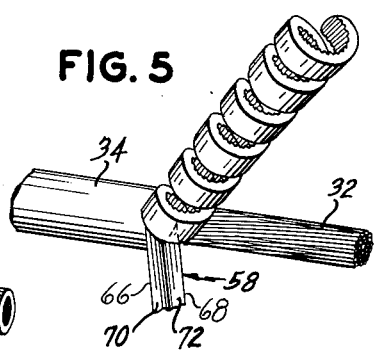
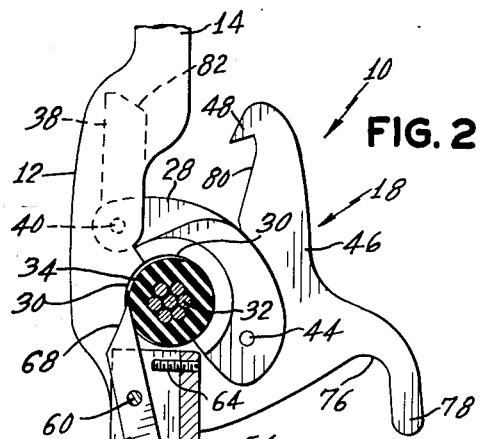
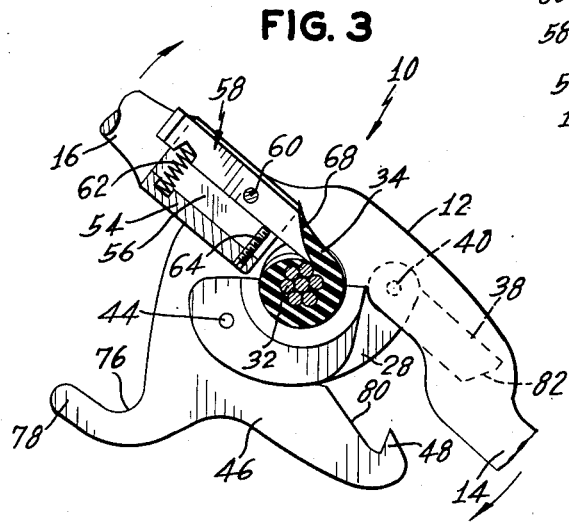
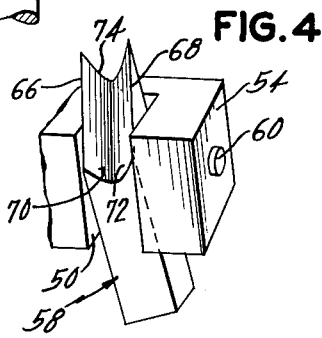
INVENTOR.
James J. Matthews
BY
ATTORNEY

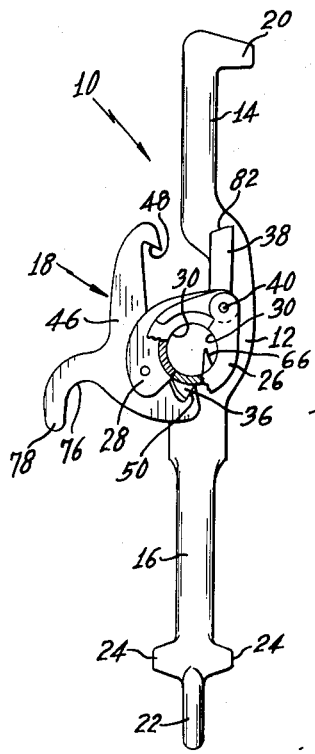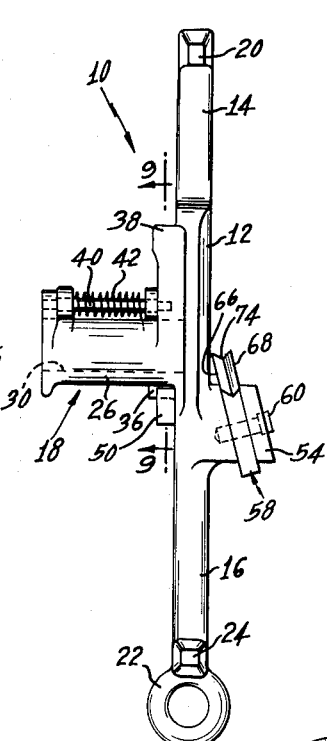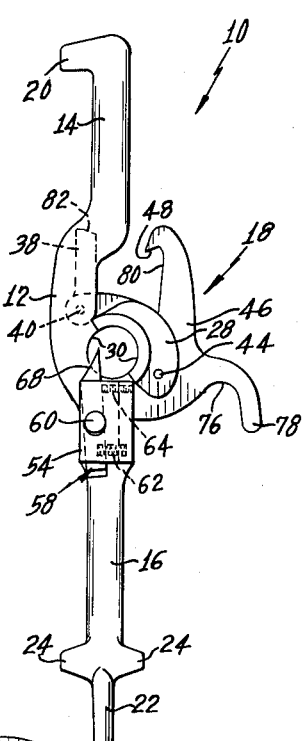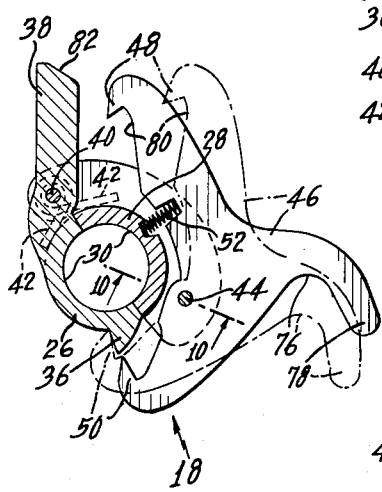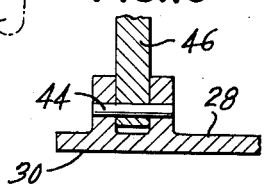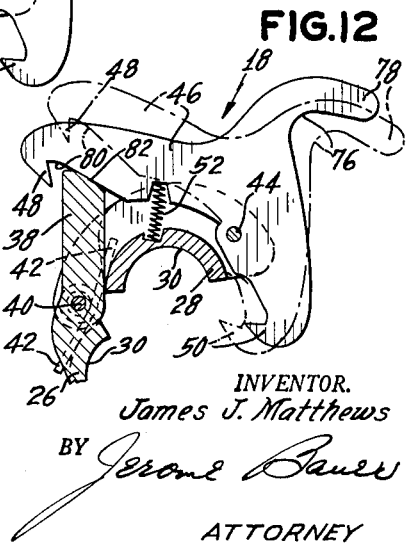

United States Patent Office 3,204,495
Patented Sept. 7, 1965

3,204,495
INSULATION REMOVING TOOL
James J. Matthews, 104 N. Clinton Ave., Hicksville, N.Y.
Filed Feb. 6, 1964, Ser. No. 342,897
10 Claims. (Cl. 81—9.5)

This invention relates to cable stripping tools and more particularly to the type for cutting and stripping insulation from heavy wire and cable.

It has long been a problem to cut and strip heavy insulation from about large size wire and cable. The problem is even more increased when the insulation of such wire and cable is very thick and exposed to varying severe weather conditions. In fact, difficulty is experienced in cutting and properly stripping or removing heavy insulation from high tension wires and telephone cable during warm weather when the insulation is reasonably soft, no less, the task is even more difficult in cold weather when the insulation is impenetrably hard and brittle. The problem is compounded, at times, by the inability of the repairman to work closely to the wire or cable, but rather who must often perform his function from a great distance by standing on the ground below.

To this end, it is the desire and purpose as well as the object of this invention to overcome the aforementioned probems by the provision of a device that will enable a repairman to utilize the same to cut and strip insulation from wire and cable without difficulty.

An object of the invention is to provide an insulation cutting and stripping device that can be used at any given distance from the wire and cable and regardless of the weather conditions.

Another object is to provide an insulation cutting and stripping device that can be quickly and easily applied to and removed from the wire or cable to be stripped without requiring assembly or disassembly of any part of the device and without the need for the repairman to physically touch the wire or cable during the cutting and stripping of the insulation. Accordingly, a feature and object of the invention is the provision of a novel clamp, the details of which enable the device to be easily and simply positioned about the wire or cable for movement therealong while also guiding associated structure of the device to cut and strip the insulation, as well as to facilitate rapid simple removal of the same from the stripped wire or cable without dismantling or disassembling any part of the device.

Still another object of the invention is to provide a device that will automatically move helically along the length of the wire or cable while cutting and stripping the insulation from it. To this end, a novel feature and object resides in the arrangement of details of an insulation removing tool which automatically cuts, tears loose and strips insulation in a helical form while causing the whole device to move in a helical path relative to the cable or wire being stripped.

Other and further objects of this invention reside in the structures and arrangements hereinafter more fully described with reference to the accompanying drawings in which:

FIG. 1 is a perspective view of the device shown in reduced scale, constructed according to the teaching of the invention and positioned about a cable already having a portion of the insulation removed therefrom, FIG. 2 is a partial cross-section of FIG. 1 taken along lines 2—2, FIG. 3 is a view similar to FIG. 2 with the device rotated slightly more than 90° about the cable being stripped, FIG. 4 is a view of the insulation removing tool, FIG. 5 is a partial view of a cable and the insulation removing tool and illustrating the helical removal of insulation from the cable, FIG. 6 is a side view of the device from a side opposite that shown in FIG.2, FIG. 7 is a front view of the device shown in FIG. 1, FIG. 8 is a view taken from the right-hand side of FIG. 7, FIG. 9 is a partial cross-section of FIG. 7 taken along lines 9—9, FIG. 10 is a partial cross-section of FIG. 9 taken along lines 10—10, FIG. 11 is a view similar to FIG. 9 with the clamp in its open position, and FIG. 12 is a view similar to FIG. 11 illustrating the operation of the latch.

Referring now to the drawings, the device for cutting and stripping insulation is generally identified in the drawings by the numeral 10. The device 10 comprises a body 12 that is formed integral with a plurality of actuator arms 14 and 16 each of which extend substantially perpendicular to the axis of an opening defined in a cable clamp structure generally identified by the numeral 18, to be described.

The arms 14 and 16 extend beyond the body 12 of the device 10 in directions opposite from each other. The arm 14 terminates in a hook-shaped finger 20 that is directed substantially normal to the length thereof. The other arm 16 terminates in a ring-shaped formation 22 and has a pair of oppositely disposed hook-shaped fingers 24 each directed in the same plane with the hook 20 and substantially normal to the length of the arm 16 and on opposite sides thereof.

The cable clamp 18 projects beyond one side of the body 12 and for convenience, it is formed with portions thereof as integral extensions of such body. The cable clamp includes a pair of relatively movable, hingedly joined, complementary shaped clamp members 26 and 28. The clamp member 26 is formed integral with the body 12. Each member 26 and 28 is elongated and has an inner surface 30. The surfaces 30 are cooperable with each other when the members 26 and 28 are in a closed position to define an elongated axially directed cable clamp opening therebetween to form a path for and in which the insulated cable or wire to be stripped is adapted to be held during such operation. This axis of the opening and the actuator arms 14 and 16 are substantially normal or perpendicular to each other.

For convenience, the workpiece, as the cable or wire whose insulation is to be stripped will hereinafter be referred to as a cable, since it is immaterial whether the device 10 is employed to remove insulation from wire or cable. The cable is shown in FIGS. 1, 2, 3 and 5 and is identified by the numeral 32. The insulation is identified by the numeral 34.

The cable clamp 18 includes as part thereof a first engageable means or element shaped as a latch finger 36. The element 36 is immovably fixed with respect to the clamp member 26, and in the drawings it is formed as an extension of the body 12. A similar or second engageable means or latch finger element 38 is also fixed with respect to the clamp member 26 and, therefore, both engageable fingers 36 and 38 are fixed in position relative to each other.

The clamp member 28 is pivotally mounted at 40 to permit the members 26 and 28 to move hingedly relative to each other thereabout. Positioned about the pivot 40 is a yieldable urging means in the form of a spring 42 the opposite ends of which are bent to bear against the outer faces of the clamp members 26 and 28 constantly urging the same into their relatively closed position as shown in FIGS. 1, 7, 9, 11 and 12.

Pivotally mounted at 44 on the clamp member 28 is a retaining means in the form of a latch element 46. The latch element 46 is adapted to cooperate with the finger 38 at its one end that is provided with a hook-shaped formation 48 and at its other similar hook-shaped end as shown at 50, with the engageable finger 36. The latch element 46 is normally urged in a clockwise direction about its pivot 44 by a yieldable means in the form of a spring 52 that is seated at one of its ends in a suitable bore provided in the outer face of the clamp element 28 and in a mating aperture provided within the latch element 46.

The body 12 is provided with a tool holder boss 54 that extends from the side thereof opposite that of the cable clamp structure 18. The boss 54 has a slot 56 defined therein that is directed at an angle relative to the axis of the cable clamp opening defined by the complementary inner surfaces 30 of the members 26 and 28. Pivotally mounted within the slot 56 is an insulation removing means or tool generally identified by the numeral 58. The body of the tool 58 is pivotally mounted at 60 for movement within the slot 56. The tool 58 is normally yieldingly urged in a clockwise direction about the pivot 60 by a resilient yieldable means taking the form of a spring or other similar structure 62. The spring 62 is retained at its opposite ends in suitable mating bores provided in the tool holder boss 54 and in the tool 58. Also positioned within the slot 56 beneath the tool 58 is an adjustable limiting means in the form of a set screw or other suitable structure 64.

The insulation removing tool 58 includes a sharp cutting edge 66 along one side thereof and another cutting edge 68 along the other side thereof. These edges are formed by sloping surfaces 70 and 72 that terminate in the formation of an insulation stripping or tearing edge 74. The edges 66 and 68 are adapted to cut the cable insulation 34. They are directed angularly toward the adjacent side of the cable clamp opening defined by the members 26 and 28 of the structure 18. Being spaced from the adjacent mouth or end of the opening, the edges 66 and 68 are directed angularly along and relative to the axis thereof. The edge 74 is angularly related to the cutting edges 66 and 68 while the surfaces 70 and 72 are directed angularly inward toward the cable clamp opening.

In operation, the device 10 is positioned as shown in FIGS. 6, 7 and 8. The cable clamp structure 18 is normally closed. The clamp members 26 and 28 are held in their closed relationship by the hook-shaped finger 50 of the latch element secured over the engageable finger means 36 as shown in FIGS. 1, 2, 3, 6, 7, 8 and in dash lines in FIG. 9. If the device 10 is to be utilized to cut and strip insulation from a stationary telephone or high tension electric cable of the type 32, 34 strung between two supports above the ground, it is often difficult for the repairman to accomplish the insulation removing function.

However, with the present device the actuator arm 16 is inserted into the normal shotgun arm of a long stick (not shown) normally used by repairmen. The device 10 is lifted up by the shotgun to the cable 32, 34 so that the inside curve 76 formed by a downwardly directed actuator arm 78 at an end of the latch 46 is positioned over the insulation 34 of the cable 32. The device 10 is then pulled downward by the shotgun while the curve 76 remains mounted over the cable insulation. The downward movement of the device 10 causes the latch 46 to pivot or move counterclockwise about its pivot 44 with respect to the downwardly moving device 10. This causes the latch hook-shaped finger 50 to be pulled free of the cooperating engageable finger 36 causing it to move from its dash line position of FIG. 9 to its full line position free of the engageable means 36 as shown in FIG. 9. This relative counterclockwise motion of the latch 46 is in opposition to the normal urging of the latch spring 52.

Continued downward movement of the device 10 by the shotgun, while the inside curve 76 of the actuator arm 78 of the latch 46 is hooked over the insulation 34 of the cable 32, physically lifts the clamp member 28 causing it, too, to rotate counterclockwise about the clamp pivot 40 in opposition to the normal urging of the spring 42. This relative movement of the latch 46 and the clamp member 28 to which it is pivoted relative to the remainder of the downwardly moving device 10 brings the upper hook-shaped finger of the latch 46 into position such that it rides over the second cooperating engageable finger means 38. At that time, if downward pressure by way of the shotgun is now released on the device 10, and the device is now lifted upwardly off the cable so as to lift the actuator arm 78 and its curve 76 upwardly off the insulation 34 of the cable 32, the normal urging of the spring 42, tending to return the clamp member 28 clockwise downward about the pivot 40 toward the member 26, causes the latch finger 48 to move into positive locking and retaining engagement with the engageable finger means 38 as shown in FIG. 11.

With the latch finger 48 engaged with the finger 38 as shown in FIG. 11, the clamp structure 18 is now in its open position with its two clamp members 26 and 28 spaced from each other. The relative spacing between these two clamp members defines a side entranceway for the admission of the cable 32, 34 into the opening provided by the complementary semi-circular shaped surfaces 30. The receipt of the cable between the surfaces 30 is facilitated by raising the device 10 until the space or entranceway between the two clamp members 26 and 28 is axially aligned with the length of the cable 32, 34. The device 10 is then positioned on the cable so that the cable rests against the inner surface 30 along the elongated length thereof of the clamp member 28.

The device 10 is then pulled downwardly slightly against the length of the cable. The downward pull on the device 10 causes the whole of the device to move down with the shotgun while the clamp member 28 rests against the length of the stationary cable. Thus, the clamp member 28 may be said to move relative to its complementary clamp member 26 and the remainder of the device 10. During such downward movement of the device 10, and with the clamp member 28 positioned at its surface 30 to rest against the cable 32, 34, the clamp member 28 is caused to rise and tilt slightly from its substantially horizontal position as shown in FIG. 11 to its slightly tilted position during which it pivots about the pin 40 as shown in FIG. 12.

The pivoting of the member 28 during the downward movement of the device 10 causes the cam surface 80 of the latch to ride upward and along the corresponding cam surface 82 of the finger 38. As soon as the hook finger 48 of the latch moves from its position in FIG. 11 it becomes spaced from the finger 38 as shown in full lines in FIG. 12. The spring 52, acting against the latch 46, pivots the same clockwise about the pin 44 into the dash line position of FIG. 12. This immediately spaces the hook finger 48 up and away from the retaining finger 38. Now that the latch 46 is disengaged from the finger 38, the repairman raises his shotgun and the device 10 upward slightly off the cable, permitting the ends of spring 42 of the clamp structure 18 to pivot the clamp member 28 relative to the clamp member 26 downward in a clockwise direction.

As the clamp member 28 pivots downward, the hook-shaped finger 50 rides over and along the cam surface 84 of the cooperating engageable finger means 36. The spring force 42 is sufficient to cause the hook finger 50 to ride down along the cam 84 and back into the dash line position of engagement with the finger 36 as shown in FIG. 9. The latch finger 50 is retained in engagement with the finger 36 by the additional urging of the spring 52. Thus, the clamp members 26 and 28 of the clamp structure 18 are retained in their clamping position about the cable 32, 34 as shown in FIGS. 1, 2 and 3.

During the aforedescribed clamping of the cable by the device 10, the insulation removing tool 58 is normally positioned with its edges 66, 68 and 74 in obstructing axial relationship with respect to the opening defined by the surfaces 30 of the clamp structure. However, during such clamping operation the tool 58 is pivotally yieldable radially by the pressure of the cable 32, 34 thereagainst so its edges will rest against the outer surface of the insulation 34 of the cable as shown in FIGS. 1 and 2. It will be noted in FIG. 2 that the points of the cutting edges 66 and 68 rest against the outer surface of the insulation 34 while the stripping or tearing edge 74 is positioned slightly remote therefrom.

When so located, the spring 62 acts upon the tool 58 to pivot the same so its edge 74 will move in a radial direction towards the axis of the cable clamp opening and with respect to the cable therein. The extent of the radial movement of the tool 58 is limited by the adjustment of the stop or limiting means 64. When once the device 10 is positioned about the cable 32, 34 as shown in FIG. 1, the shotgun is removed from the actuator arm 16. The repairman now utilizes a long pole 86 shown in dash lines in FIG. 1 that has a hook 88. The hook 88 is positioned about the actuator arm 14 beneath the finger 20. The pole 86 is pulled causing the arm 14, its attached body 12, and the remaining structure of the device 10 to rotate about the axis of the cable 32, 34 in a clockwise direction as viewed in FIGS. 1, 2 and 3.

Because the tool 58 is spaced from the opening 30 of the cable clamp structure 18 and directed at an angle toward the opening and radially inward relative to the axis of such opening, as a result of the forceful urging of the spring 62 thereupon, as the device 10 is rotated by the repairman by the use of the pole 86, the cutting edge 66 begins to dig deeper and deeper into the insulation 34. After a rotation of slightly more than 90° of the device 10 about the cable 32, 34, the tool 58 works its way through the insulation 34 up to the bundle of cables 32 therewithin as shown in FIG. 3.

At such time, the points of the cutting edges 66 and 68 are positioned tangentially beyond the bundle of cables 32 and prevented from digging closer into the cables by the adjusted location of the limiting means 64. However, the stripping and tearing edge 74 almost rests on the bundle of cables. Hence, during the revolution or rotation of the device 10 by the repairman about the cable, the edge 66 cuts the insulation 34 while the edge 74 physically tears the same free of its adherence to the bundle of cables 32. As the insulation 34 is torn free, it is lifted by the edge 74 and directed toward the lifting surface 72 of the tool 58. The lifting surface 72 completely removes the insulation 34 from the bundle of cables 32.

Because the tool 58 is directed at an angle toward the body 12 and the cable clamp opening 30, the rotation of the device 10 about the cable 32, 34 causes the same to move in a helical manner therealong. This is because the cutting edge 66 acts as a threading nut about a screw seeking its own threading movement along the cable insulation 34. During this helical movement, the insulation 34 being cut and stripped from the bundle of cables 32 is lifted by the surface 72 in a helical formation and physically removed from the cables in the manner shown in FIG. 5.

When the proper or desired length of insulation 34 has been removed, the repairman merely pulls on his pole 86 slightly to the right preventing the tool 58 from threading along the length of insulation while at the same time rotating the device 10 in place about the insulated cable 32, 34. The cutting edge 66 of the tool thus no longer is able to move helically along the cable because of the opposite forces applied to the arms 14 and 16 by the repairman by way of his pole 86 and thereby a smooth radial cut is made about the insulation as is shown in FIG. 1. This FIG. 1 shows that the insulation 34 had previously been stripped from the cable 32 and a new cut is about to be made by the device 10.

When it is desired to cut a length of insulation 34 from along the intermediate length of a cable 32, the beginning cut is made by both edges 66 and 68 until such time as the tool 58 has reached the depth of its cut permitted by the limiting screw 64. Thereafter, only the cutting edge 66 is required to further thread the device 10 helically along the cable insulation 34.

After the desired length of the insulation 34 is removed in the manner described, the device 10 can be lifted free of the cable 32, 34. This is done by placing the shotgun back over the actuator arm 16 to hold the device 10. The pole 86, having already been lifted free of the actuating arm which it last engaged, is then pressed upward against the inside curve 76 of the latch 46 when the same is locked in position such as shown by the dash lines in FIG. 9. The upward force of the hook 88 of the pole 86 against the latch 46 causes the same to pivot in a counterclockwise manner at 44 against the normal urging of the spring 52. This pulls the hook-shaped finger 50 of the latch free of engagement with the engageable means 36 causing it to move into the position as shown in solid lines in FIG. 9. Continued upward movement of the pole 86 pivots the clamp member 28 upward about the pivot 40 in opposition to the springs 42 and 52 until such time as the latch finger 48 rides over the cam surface 82 of the engageable means 38. At that time, the repairman releases his upward pressure on his pole 86 permitting the latch finger 48 to rest in engagement against the finger 38. This engagement is aided by the force of the spring 42 acting on the clamp member 28. The pole 86 is removed from engagement with the actuator arm 78 and the device 10 is lifted by the shotgun to permit the cable 32, 34 to be removed from within the device through the entranceway defined between the again spaced clamp members 28 and 26.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

I claim:

1. A device for cutting and stripping insulation from a cable comprising a body, a cable clamp on said body including a pair of hingedly joined members, a latch on one of said members operable to hold said members closed to define a cable opening path therebetween and engageable with means on said device to hold the same open to permit the insertion and removal of a cable from therebetween, a tool pivoted on said body beyond said clamp, means yieldingly urging said tool into the path of said cable opening, said tool including means thereon to cut and strip insulation from a cable in said cable opening path, and at least an arm on said body by which said body may be manually rotated about a cable in said cable opening.

2. A device for cutting and stripping insulation from a cable comprising a body having an axially extending first clamp member, an axially extending second clamp member hingedly connected to said body for closing movement relative to said first clamp member to define an axially extending cable opening therebetween, latch means pivoted on said second clamp member and means on said device engageable by said latch means to hold said members closed, a tool movably mounted on said body and spaced beyond said cable opening, means yieldingly urging said tool into a position of at least partially obstructing said cable opening, said tool having means to cut insulation on a cable and means to remove cut insulation from a cable, and at least an arm on said body for manual rotation of said body about a cable.

3. A device for cutting and stripping insulation from a cable comprising a cable clamp including a plurality of members relatively movable between a closed and an open position whereby the same define an axially directed cable opening to receive a cable therein and for movement relative to said device, latch means connected with said cable clamp to retain said members in their closed and open positions, a tool movable on said device spaced from one end of said cable clamp, and means on said device urging said tool for movement on said device and into a position obstructing its respective end of said cable opening and for engagement with a cable extending beyond said opening in the direction of said tool.

4. A device for cutting and stripping insulation from a cable comprising a cable clamp including a plurality of elongated cable clamp members each movable relative to the other from an open position whereby the same define a side entrance through which an insulated cable may be inserted radially therebetween, said members being movable relative to each other to a closed position to close said entrance and define an axially directed elongated opening in which the insulated cable is held for axial movement relative to the cable clamp, releasable means on said device to releasably retain said clamp members in their open and closed positions, a tool movable on said device beyond one end of said opening, and means urging said tool to engage the insulation of a cable in said opening and extending therebeyond in the direction of said tool, said tool having means thereon to cut the engaged insulation in a helical direction and means to tear loose and helically strip the cut insulation from the cable.

5. A device for cutting and stripping insulation from a cable comprising a cable guide having an elongated axially directed opening in which an insulated cable is to be held, said cable guide being adapted to be moved axially relative to the cable when the same is held in said opening, a tool on said device having insulation cutting means positioned beyond an end of said opening and at an angle to the axis of said opening in the direction of movement of said cable guide relative to a cable held in the opening thereof, means on said tool to lift out insulation helically, means on said device to rotate the same about a cable held in said axial opening of said cable guide, said angularly positioned cutting means cutting insulation helically about the length of a cable held in said opening to cause said cable guide to move axially relative to the cable, said means to rotate said device about a cable held in the axial opening of said cable guide including a plurality of arms each extending substantially perpendicular to the axis of said opening beyond said device and in opposite directions from the other, one of said arms having a hook finger directed substantially normally thereto, the other of said arms terminating in a ring-shape and having a pair of oppositely disposed hook fingers each directed substantially normal thereto and on opposite sides thereof.

6. A device for cutting and stripping insulation from a cable comprising a body, a cable clamp including a pair of relatively movable complementary shaped members each having an elongated inner surface cooperable with the other in a closed position to define an axially directed opening therebetween in which an insulated cable is adapted to be held during movement of said device along a cable held thereby, said cable clamp projecting beyond one side of said body, means normally urging said members into a closed position and yieldable to permit said members to move into an open position to define an elongated entrance for insertion of an insulated cable therebetween, means to retain said members in their open and closed positions, a pair of actuator arms each extending from opposite sides of said body to enable said device to be rotated about a cable held in said opening, a tool movable on said body and positioned on a side thereof opposite said cable clamp and beyond the opening thereof and directed at an angle to the axis thereof to engage insulation on a cable in said opening and normally to move said device helically along the cable during the rotation of said device by said arms, and yieldable means normally urging said tool into obstructing relationship with said opening.

7. A device for cutting and stripping insulation from a cable comprising a body, a cable guide extending from one side of said body and having an elongated axially directed opening in which an insulated cable is to be held to guide said device for movement axially along the insulated cable and rotatively thereabout, a tool having insulation removing means movably mounted on said body on a side thereof opposite said cable guide and spaced from said guide opening, means normally urging said tool to move said insulation removing means into obstructing relationship with said clamp opening, means on said body to limit the movement of said tool, said insulation removing means being directed at an angle to the axis of said opening and facing in the direction of said opening, said urging means urging said tool to move said insulation removing means radially inward into obstructing relationship with said guide opening toward the axis thereof, said insulation removing means including at least an insulation cutting edge on said tool closest to said opening, an insulation stripping edge angularly related to said cutting edge and an insulation lifting surface angularly related to said stripping edge.

8. A device as in claim 7, said cable clamp including a plurality of relatively moveable members each having an elongated surface thereon cooperable with the other to define said elongated axially directed opening when said members are in a closed position, a latch pivotable on one of said members and first engageable means on said device engageable by said latch to retain said members in their closed position, means yieldingly urging said latch for engagement with said first engageable means, actuator means on said latch to disengage the same from said first engageable means and to move said members to an open position defining a side entrance therebetween for the insertion of a cable therethrough, and second engageable means releasably engageable by said latch to retain said members in an open position, said second yieldable means urging said members to their closed position and said latch and second engageable means for engagement, said one member being movable to disengage said latch from said second engageable means to permit said second yieldable means to move said members to their closed position and said latch for engagement with said first engageable means.

9. In a device engageable with an insulated cable for movement thereabout and along the axis thereof, a tool on said device for removing insulation from the cable including an insulation stripping edge at one end thereof, a lifting surface on said tool directed angularly away from said stripping edge, at least an insulation cutting edge tangent to said cable directed at an angle to the axis of the cable in the direction of movement of said device along said cable and at an angle to said stripping edge, and means operable on said tool to urge said stripping edge radially inward toward the axis of the cable.

10. In a device for clamping a cable, a plurality of hingedly connected members for movement relative to each other between open and closed positions, said members each having a surface defining a part of a cable receiving opening when said members are moved to their relatively closed position and defining a space therebetween when moved to their relatively open position to permit the receipt and the removal of a cable in said opening, latch means on one of said members, a plurality of engageable means on the other of said members, one of said engageable means being cooperable with said latch means to retain said members in their relatively open position and another cooperable with said latch means to retain said members in their relatively closed position, means normally urging said latch means out of cooperable engagement with one of said engageable means, and means normally urging said members into their relatively closed position.

References Cited by the Examiner

UNITED STATES PATENTS

| | | | |
|---|---|---|---|
| 1,493,517 | 5/24 | Bush | 81—53 |
| 2,120,398 | 6/38 | Edwards et al. | 81—9.5 |
| 2,360,363 | 10/44 | Pope | 83—924 |
| 2,897,702 | 8/59 | Ghiglia | 81—9.5 |
| 3,057,232 | 10/62 | Cornell | 81—9.5 |

FOREIGN PATENTS 529,066  11/40  Great Britain.

References Cited by the Applicant

UNITED STATES PATENTS

| | | |
|---|---|---|
| 1,165,176 | 12/15 | Hornor. |
| 1,275,225 | 8/18 | Cleve. |
| 1,725,114 | 8/29 | Van Gelderen. |
| 2,141,002 | 12/38 | Huff. |
| 2,551,401 | 5/51 | Underhill. |
| 2,627,768 | 2/53 | Cook. |
| 2,903,064 | 9/59 | Blonder. |

WILLIAM FELDMAN, *Primary Examiner.*
MILTON S. MEHR, *Examiner.*